United States Patent Office 3,282,772
Patented Nov. 1, 1966

3,282,772
LAMINATED GLASS
Curtis W. Davis, Sr., Toledo, Ohio, assignor to Libbey-Owens-Ford Glass Company, Toledo, Ohio, a corporation of Ohio
Filed June 28, 1965, Ser. No. 472,387
5 Claims. (Cl. 161—165)

This is a continuation-in-part of my application Serial No. 107,687, filed May 4, 1961, and now abandoned.

The present invention relates to improved laminated glass structures which, while not limited to any specific use, are of particular utility for use as the windshields of automotive vehicles.

In modern automobiles the windshield consists of a single sheet of laminated glass extending across the body of the automobile and inclined rearwardly at an angle to the vertical. Also, the windshields are curved and include rather sharply bent end or wing portions which project rearwardly toward the body of the automobile.

Such laminated glass windshields ordinarily consist of two sheets of glass approximately 1/8" thick and an interposed layer of polyvinyl butyral plastic having a thickness of .015" bonded to the glass sheets to form a unitary structure. In some cases, the plastic interlayer is provided with a colored strip or band along its upper edge portion for the general improvement of visual conditions for the driver.

While present-day laminated windshields possess substantial safety characteristics for the protection of the driver and other occupants of the automobile, the present invention contemplates improved laminated structures having novel and special characteristics which afford even greater protection from objects striking the windshield from the outside as well as reducing the likelihood of injury to the occupants due to the striking of the head or other parts of the body against the windshield if involved in an accident.

Among the important objects of the present invention, therefore, are to provide a laminated automobile windshield which is (1) safer than present-day windshields; (2) possesses greatly increased inherent strength which enables it to resist the normal torque or twisting as well as the vibrations to which automobiles are subjected during operation; (3) has greater impact strength and resistance to breakage when struck by objects such as stones, pieces of metal or even birds from the outside; (4) is subject to less spalling from the inside when broken thereby reducing the amount of flying glass which would otherwise be a possible source of injury to the occupants of the automobile; and (5) is less rigid, or in other words, more yielding when impacted from the inside thereby reducing the likelihood of injury to the driver or occupant of the front seat.

Other objects and advantages of the invention will become more apparent during the course of the following description when take in connection with the accompanying drawings.

In the drawings wherein like numerals are employed to designate like parts throughout the same:

As noted above, present-day laminated windshields ordinarily comprise two sheets of glass of about the same thickness, i.e., 1/8" and a plastic interlayer of .015" thickness. For purposes of simplicity, this type of windshield will be hereinafter referred to as a "symmetrical" windshield. The basic concept of this invention is to provide a special laminated windshield which is "asymmetrical" in that glass sheets of different thicknesses are employed. More particularly, one of the sheets of glass is of a thickness relatively greater than 1/8", while the second glass sheet is of a thickness relatively less than 1/8". In addition, the plastic interlayer is, though not always necessary, preferably relatively thicker than the plastic interlayers heretofore used. When the improved windshield is installed in functional position in an automobile, the thicker glass sheet faces outwardly and will be referred to herein as the "outboard" sheet, whereas the thinner glass sheet faces inwardly and constitutes the "inboard" sheet.

Figure 1:
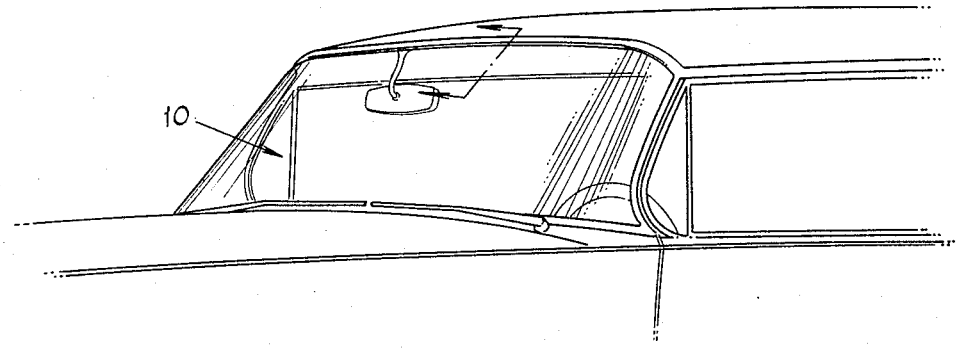
FIG. 1 is a perspective view of the front portion of an automobile equipped with a windshield made in accordance with the invention.
Figure 2:
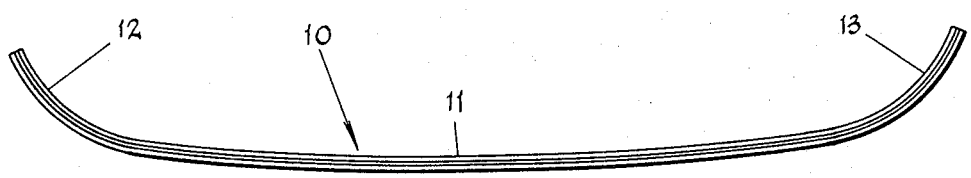
FIG. 2 is a side elevation of the windshield.
Figure 3:
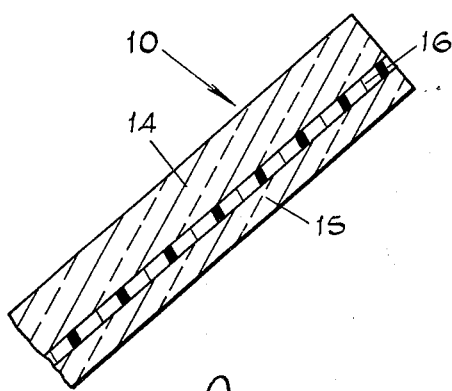
FIG. 3 is a vertical section through a portion of the windshield taken substantially on line 3—3 of FIG. 1.

With reference to the drawings and particularly to FIGS. 1 to 3, there is disclosed a bent laminated windshield designated by the numeral 10 and comprising a central portion 11 of relatively shallow curvature extending across the front of the automobile and merging at its opposite ends into the wing portions 12 and 13 which curve rearwardly toward the body of the automobile. The invention is of course not limited to a windshield of any particular curvature, nor in fact does it have to be curved at all. The windshield 10 is formed of two sheets of glass 14 and 15 and an interposed layer of plastic 16, preferably polyvinyl butyral, bonded to the glass sheets to provide a unitary structure.

According to the invention and as shown in FIG. 3, the glass sheet 14, which constitutes the outboard sheet, is of relatively greater thickness than the glass sheet 15 which constitutes the inboard sheet. More particularly, as explained above, the outboard sheet 14 is of a thickness somewhat greater than 1/8" while the inboard sheet is of a thickness somewhat less than 1/8". The thickness of the polyvinyl butyral interlayer may vary depending upon the relative thicknesses of the glass sheets. While the relative thicknesses of the glass sheets may also vary within certain limits, the following examples show two laminates which have been found satisfactory for use as a windshield:

Example 1:                                    Inches thick
    Outboard sheet _____ .155
    Polyvinyl butyral interlayer _____ .030
    Inboard sheet _____ .090

Example 2:
    Outboard sheet _____ .155
    Polyvinyl butyral interlayer _____ .030
    Inboard sheet _____ .065

It will of course be appreciated that so long as the proper thickness relationship between the glass sheets and plastic interlayer is maintained certain variations may be made in such thicknesses without departing from the spirit of the invention. Thus, the relative thicknesses of the glass sheets and plastic interlayer may be in the following ranges:

| | Inches |
|---|---|
| Outboard sheet | .130 to .170 |
| Plastic interlayer | .015 to .045 |
| Inboard sheet | .040 to .110 |

It has been found that with the asymmetrical laminates of this invention the amount of glass dislodged from the inboard glass sheet upon subjection of the outboard glass sheet to impact is substantially less than the glass dislodged from the outboard sheet when the inboard sheet is impacted or when the laminate is symmetrical. Tests were conducted using steel balls of different sizes and impacting the laminates by dropping the balls from different heights. The amount of glass dislodged or separated from the sheet opposite the sheet impacted was then collected and weighed, with the results shown in the following table:

TABLE I

*Symmetrical laminate—Two glass sheets ⅛″ thick and .015″ polyvinyl butyral plastic interlayer*

| | Wt. in grams |
|---|---|
| ½ lb. ball—45′—glass dislodged | 9.778 |
| 2 lb. ball—9′—glass dislodged | 1.789 |
| 2 lb. ball—12′—glass dislodged | 3.494 |
| 11 lb. shot bag—15′—glass dislodged | 11.982 |

*Asymmetrical laminate—Outboard glass sheet .155″ thick, polyvinyl butyral interlayer .030″ thick, and inboard glass sheet .090″ thick (inboard sheet impacted)*

| | Wt. in grams |
|---|---|
| ½ lb. ball—45′—glass dislodged from outboard sheet | 10.526 |
| 2 lb. ball—9′—glass dislodged from outboard sheet | 4.411 |
| 2 lb. ball—12′—glass dislodged from outboard sheet | 5.634 |
| 11 lb. shot bag—15′—glass dislodged from outboard sheet | 10.336 |

*Asymmetrical laminate—Relative thicknesses of glass and plastic same as above (outboard sheet impacted)*

| | Wt. in grams |
|---|---|
| ½ lb. ball—45′—glass dislodged from inboard sheet | 4.273 |
| 2 lb. ball—9′—glass dislodged from inboard sheet | .760 |
| 2 lb. ball—12′—glass dislodged from inboard sheet | 1.634 |
| 11 lb. shot bag—15′—glass dislodged from inboard sheet | 1.194 |

From the above, it will be seen that the amount of glass dislodged from the inboard sheet upon impaction of the outboard sheet with a half pound ball at 45 feet was approximately 128% less than the glass dislodge from the non-impacted sheet of the symmetrical laminate and approximately 146% less than the glass dislodged from the outboard sheet when the inboard sheet was impacted. Substantially less glass was also dislodged from the inboard sheet when the outboard sheet was impacted with a 2 pound ball at 9 feet, with a 2 pound ball at 12 feet and with an 11 pound shot bag at 15 feet. This is extremely important in that the amount of flying glass present inside the automobile upon impact of the outboard sheet will be materially reduced, thereby minimixing the liability of injury to the driver or other occupants.

Laminates made according to Example 2 above consisting of an outboard glass sheet .155″ thick, a polyvinyl butyral plastic interlayer .030″ thick, and an inboard glass sheet .065″ thick were also subjected to impact tests, with the following results:

TABLE II

*Asymmetrical laminate (inboard sheet .065″ thick impacted)*

| | Wt. in grams |
|---|---|
| ½ lb. ball—45′—glass dislodged from outboard sheet | 14.725 |
| 2 lb. ball—9′—glass dislodged from outboard sheet | 9.271 |
| 2 lb. ball—12′—glass dislodged from outboard sheet | 9.566 |
| 2 lb. ball—15′—glass dislodged from outboard sheet | 10.139 |
| 11 lb. shot bag—9′—glass dislodged from outboard sheet | 4.177 |
| 11 lb. shot bag—12′—glass dislodged from outboard sheet | 5.369 |

*Asymmetrical laminate (outboard sheet .155″ thick impacted)*

| | Wt. in grams |
|---|---|
| ½ lb. ball—45′—glass dislodged from inboard sheet | 3.289 |
| 2 lb. ball—9′—glass dislodged from inboard sheet | .611 |
| 2 lb. ball—12′—glass dislodged from inboard sheet | 1.783 |
| 2 lb. ball—15′—glass dislodged from inboard sheet | 1.629 |
| 11 lb. shot bag—9′—glass dislodged from inboard sheet | .360 |
| 11 lb. shot bag—12′—glass dislodged from inboard sheet | 2.618 |

Here again it will be seen that the amount of glass dislodged from the inboard glass sheet when the outboard glass sheet was impacted was considerably less than the glass dislodged from the outboard sheet when the inboard sheet was impacted.

Both symmetrical and asymmetrical laminates, 12″ x 12″, were also tested to determine the amount of glass that would be dislodged from the surface of the sheet impacted. For these tests a 2 pound steel ball was dropped from a distance of 9 feet. With the symmetrical laminates formed of ⅛″ glass sheets and .015″ polyvinyl butyral plastic, 5.86 grams of glass were dislodged from the surface impacted. However, when impacting the thinner inboard sheet of an asymmetrical laminate formed of .065″ and .155″ thick glass sheets and .030″ polyvinyl butyral plastic interlayer only 3.9 grams of glass were dislodged. Not only was less glass dislodged from the thinner inboard glass sheet upon impaction than in the symmetrical laminate but, in addition, the number of particles that were dislodged were fewer and also smaller than those dislodged from the symmetrical laminate.

As pointed out above, the special laminated windshields of this invention possess greater strength when subjected to flying objects striking the thicker outboard sheet of glass than do the customary symmetrical windshields. Thus, in flexure testing both symmetrical laminates and the asymmetrical laminates herein provided for determination of modulus of rupture, the following values were obtained:

(A) Symmetrical laminate. Fifty laminates 3″ x 10″ and fromed of two sheets of glass ⅛″ thick and a .030″ thick polyvinyl butyral plastic interlayer showed an average modulus of rupture of 4570 p.s.i.

(B) Asymmetrical laminate. Fifty laminates 3″ x 10″ and formed of one sheet of glass .155″ thick, a polyvinyl butyral plastic interlayer .030″ thick, and a second glass sheet, .090″ thick had an average modulus of rupture of 4570 p.s.i. when the bending load was applied to the thinner sheet.

(C) Asymmetrical laminate. Fifty laminates which were the same in all respects as in (B) above but with the .155" thick glass sheet being loaded had an average modulus of rupture of 6200 p.s.i.

From the above, it will be seen that the average modulus of rupture for the asymmetrical laminates, when the thicker outboard sheet was subjected to a bending load, was approximately 35% greater than the average modulus of rupture of the symmetrical laminates and the asymmetrical laminates when the thinner inboard glass sheet was loaded. It is pertinent to note that the symmetrical laminates tested included .030" thick polyvinyl butyral interlayers so that the increase in the modulus of rupture of the asymmetrical laminates where the thicker outboard sheet was loaded cannot be attributed solely to the use of a plastic interlayer of increased thickness over the .015" plastic interlayer ordinarily employed. In fact, it has been found that the average modulus of rupture of symmetrical laminates employing two sheets of 1/8" glass and a polyvinyl butyral plastic interlayer of .015" is about 4500 p.s.i.

Modulus of rupture tests were also conducted on asymmetrical laminates 3" x 10" consisting of an outboard glass sheet having a thickness of .155", a polyvinyl butyral plastic interlayer .030" thick, and an inboard glass sheet .065" thick. One hundred of such laminates were tested—fifty with the thinner inboard sheet being subjected to a bending load and fifty with the thicker outboard sheet being loaded. The fifty laminates tested with the inboard sheet being loaded showed an average modulus of rupture of 4890 p.s.i.; whereas the fifty laminates tested with the outboard sheet being loaded had an average modulus of rupture of 6540 p.s.i. Thus, the modulus of rupture of the laminates was about 33% greater when the outboard sheet was subjected to a bending load than when the inboard sheet was loaded.

All of the above modulus of rupture tests were conducted on strips of laminated glass three inches wide and ten inches long. The laminated strips were laid horizontally upon cross-bars having a span of eight inches. The upper edges of the bars were slightly rounded and were approximately 3/32 of an inch wide. Bending pressure was then applied to the upper surfaces of the glass strips midway between the cross-bars until both glass strips fractured. The above procedure is according to the American Society of Testing Materials ASTM C-158-43.

While the thickness of the plastic interlayer may vary, the use of a thicker interlayer in the special laminates of this invention possess certain advantages in that when the laminate is impacted from the inside the thicker plastic interlayer tends to yield or "give" to a greater extent than would a thin interlayer. Also, the thinner inboard glass sheet is less rigid and will fracture more easily thereby resulting in a windshield which is more yielding upon impaction from the inside such as when struck by the driver or other occupant of the automobile. Not only does the plastic interlayer tend to give, but it has also been found that upon fracture of the thicker outboard sheet resulting from the impaction of the thinner inboard sheet the plastic tends to round off the edges of the outer glass sheet where the plastic shears off so that said edges have the general appearance of tempered glass when broken.

A further advantage of the special laminates of this invention is that when the windshield is mounted in functional position in an automobile, with the thinner glass sheet being the inboard sheet the resistance of the windshield to breakage by flying objects such as stones and other objects or even birds is substantially increased over a symmetrical laminate including two sheets of 1/8 inch glass and a polyvinyl butyral plastic interlayer having a thickness of either .015" or .030". Here again, the strength of the windshield is derived from the relative thicknesses of the glass sheets and the plastic interlayer rather than simply from an increase in the thickness of the plastic interlayer. This is clearly shown by the results of a series of impact or break tests which are set forth in the following tables. In all of these tests 12" x 12" laminates were used, the interlayer was polyvinyl butyral, and at the critical break height both glass sheets were fractured.

TABLE III

*Break tests using an 11 pound shot bag*

| Type of Glass | Temperature | Surface Impacted | Critical Break Height |
|---|---|---|---|
| .125" Glass Sheet<br>.015" Interlayer<br>.125" Glass Sheet | Room | | 4 feet. |
| .125" Glass Sheet<br>.030" Interlayer<br>.125" Glass Sheet | Room | | 8 feet. |
| .090" Glass Sheet<br>.030" Interlayer<br>.155" Glass Sheet | Room | .090" Glass Sheet | 10 feet. |
| .090" Glass Sheet<br>.030" Interlayer<br>.155" Glass Sheet | Room | .155" Glass Sheet | Do. |

TABLE IV

*Break tests using a 2 pound steel ball*

| Type of Glass | Temperature | Surface Impacted | Critical Break Height |
|---|---|---|---|
| .125" Glass Sheet<br>.015" Interlayer<br>.125" Glass Sheet | Room | | 5-6 feet. |
| .125" Glass Sheet<br>.030" Interlayer<br>.125" Glass Sheet | Room | | 19 feet. |
| .090" Glass Sheet<br>.030" Interlayer<br>.155" Glass Sheet | Room | .090" Glass Sheet | 15 feet. |
| .090" Glass Sheet<br>.030" Interlayer<br>.155" Glass Sheet | Room | .155" Glass Sheet | 20 feet. |

Summarizing the above shot bag tests, the asymmetrical laminates showed substantially greater resistance to impact than the symmetrical laminates having either a plastic interlayer of .015" or .030" thickness. Further, the asymmetrical laminates in which the thicker outboard glass sheet was impacted with a steel ball also showed an improvement over the symmetrical laminates as well as over the asymmetrical laminates in which the thinner inboard glass sheet was impacted. This is important since when the windshield is mounted in an automobile, it is the outboard sheet that is subjected to impact from stones, pieces of metal or other objects.

In the above Tables III and IV, the glass sheets and plastic interlayers of the asymmetrical units were of the relative thicknesses given in Example 1 in column 2. Break tests were also conducted on laminates in which the glass sheets and plastic interlayers were of the relative thicknesses given in Example 2 in column 2 and the results of these tests are given in the following tables:

TABLE V

*Break tests using 11 pound shot bag*

| Type of Glass | Temperature | Surface Impacted | Critical Break Height |
|---|---|---|---|
| .065" Glass Sheet<br>.030" Interlayer<br>.155" Glass Sheet | Room | .065" Glass Sheet | 10 feet. |
| .065" Glass Sheet<br>.030" Interlayer<br>.155" Glass Sheet | Room | .155" Glass Sheet | Do. |

TABLE VI
*Break tests using 2 pound steel ball*

| Type of Glass | Temperature | Surface Impacted | Critical Break Height |
|---|---|---|---|
| .065″ Glass Sheet<br>.030″ Interlayer<br>.155″ Glass Sheet | Room | .065″ Glass Sheet | 14 feet. |
| .065″ Glass Sheet<br>.030″ Interlayer<br>.155″ Glass Sheet | Room | .155″ Glass Sheet | 17 feet. |

It will be seen that in both the shot bag tests and the steel ball tests, the asymmetrical laminates showed greater resistance to impact than the symmetrical laminates using .015″ plastic interlayers (Tables III and IV).

Figure 4:
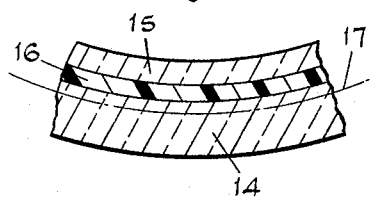
FIG. 4 is a fragmentary section of the windshield.

An important feature of the asymmetrical windshields of the present invention is that they possess increased inherent strength such that they will effectively withstand the twisting and weaving motion of an automobile as well as the vibrations thereof. This results to a considerable extent from the location of the neutral bending axis of the windshield. Thus, in symmetrical laminated windshields the neutral axis will be located in the plastic interlayer, whereas in the present invention the neutral axis is located in the outboard glass sheet. This results from the fact that the thickness of the outboard glass sheet will always be greater than the combined thicknesses of the plastic interlayer and inboard glass sheet. This is illustrated in FIG. 4 of the drawings in which the neutral axis is indicated by the line 17. The exact location of the neutral axis will of course vary with the relative thicknesses of the glass sheets and plastic interlayer but will remain in the outboard glass sheet so long as the thickness of said sheet is greater than the combined thickness of the interlayer and inboard glass sheet.

In a laminated windshield made according to the invention, the glass sheets can, if desired, consist of heat-absorbing glass. Due to the increased thickness of the outboard sheet, it will have a greater heat-absorbing capacity than would the customary ⅛″ glass sheet and will thus, under certain conditions, tend to reduce the amount of heat passing through the windshield into the automobile. This is important since at times an automobile on standing, say at ambient temperatures of 90° to 100° F., the outboard glass sheet may become heated from 150° to 160° F. However, as soon as the automobile is placed in motion, the heat in the outer sheet will be rapidly dissipated by the wind flowing across the windshield.

Figure 5:
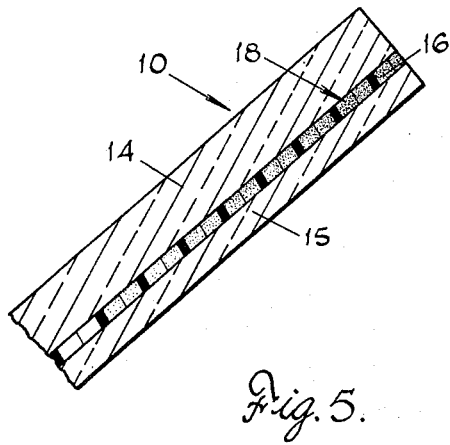
FIG. 5 is a view similar to FIG. 3 in which the plastic interlayer is provided along its upper edge with a colored anti-glare portion.

As also brought out above, the upper marginal portion of the plastic interlayer may be colored as indicated at 18 in FIG. 5 to provide a so-called shaded windshield. In such case the outboard glass sheet, due to its increased thickness, will screen out more of the ultra-violet rays which might otherwise cause a fading of the colored portion of the plastic interlayer, particularly if the outboard sheet is of heat-absorbing glass.

While the special laminated structures of the present invention have been illustrated and described herein with particular reference to use as an automobile windshield, it will be appreciated that they can also be effectively used for glazing the door and window openings of automobiles or other motor vehicles. In fact, they may be used as a closure for any openings where the strength and safety characteristics of the laminated structures may be required or desired.

I claim:

1. A laminated structure consisting essentially of two sheets of glass and a polyvinyl butyral interlayer interposed between the glass sheets and bonded thereto to provide a unitary structure, one of said glass sheets having a thickness in the range of .130 inch to .170 inch, the second glass sheet having a thickness in the range of .040 inch to .110 inch and said polyvinyl butyral interlayer having a thickness in the range of .015 inch to .045 inch but less than the thickness of said second glass sheet, with the thickness of the thicker glass sheet being greater than the combined thicknesses of the said second glass sheet and interlayer.

2. A laminated structure as defined in claim 1, in which the thickness of said one glass sheet is about .155 inch, the thickness of the polyvinyl butyral interlayer is about .030 inch, and the thickness of the second glass sheet is about .090 inch.

3. A laminated structure as defined in claim 1, in which the thickness of said one glass sheet is about .155 inch, the thickness of the polyvinyl butyral interlayer is about .030 inch, and the thickness of the second glass sheet is about .065 inch.

4. A laminated structure as defined in claim 1, in which said one glass sheet is composed of heat-absorbing glass.

5. A curved laminated windshield consisting essentially of two sheets of glass and a layer of polyvinyl butyral interposed between and bonded to the glass sheets, one of said glass sheets being thinner than the other glass sheet with the sheets being bent such that the thinner sheet is nested in the thicker sheet, the thicker glass sheet having a thickness in the range of from about .130 inch to .170 inch, the thinner glass sheet having a thickness in the range of from about .040 inch to .110 inch and the polyvinyl butyral interlayer having a thickness in the range of from about .015 inch to .045 inch but less than the thickness of said thinner glass sheet, with the thickness of said thicker sheet being greater than the combined thicknesses of said thinner glass sheet and interlayer.

References Cited by the Examiner
UNITED STATES PATENTS

| | | | |
|---|---|---|---|
| 2,444,976 | 7/1948 | Brown | 161—408 |
| 2,827,739 | 3/1958 | Atkeson | 156—102 |
| 2,946,711 | 7/1960 | Bragaw et al. | 161—199 |

ALEXANDER WYMAN, *Primary Examiner.*

W. J. VAN BALEN, *Assistant Examiner.*